Figures 1, 2:
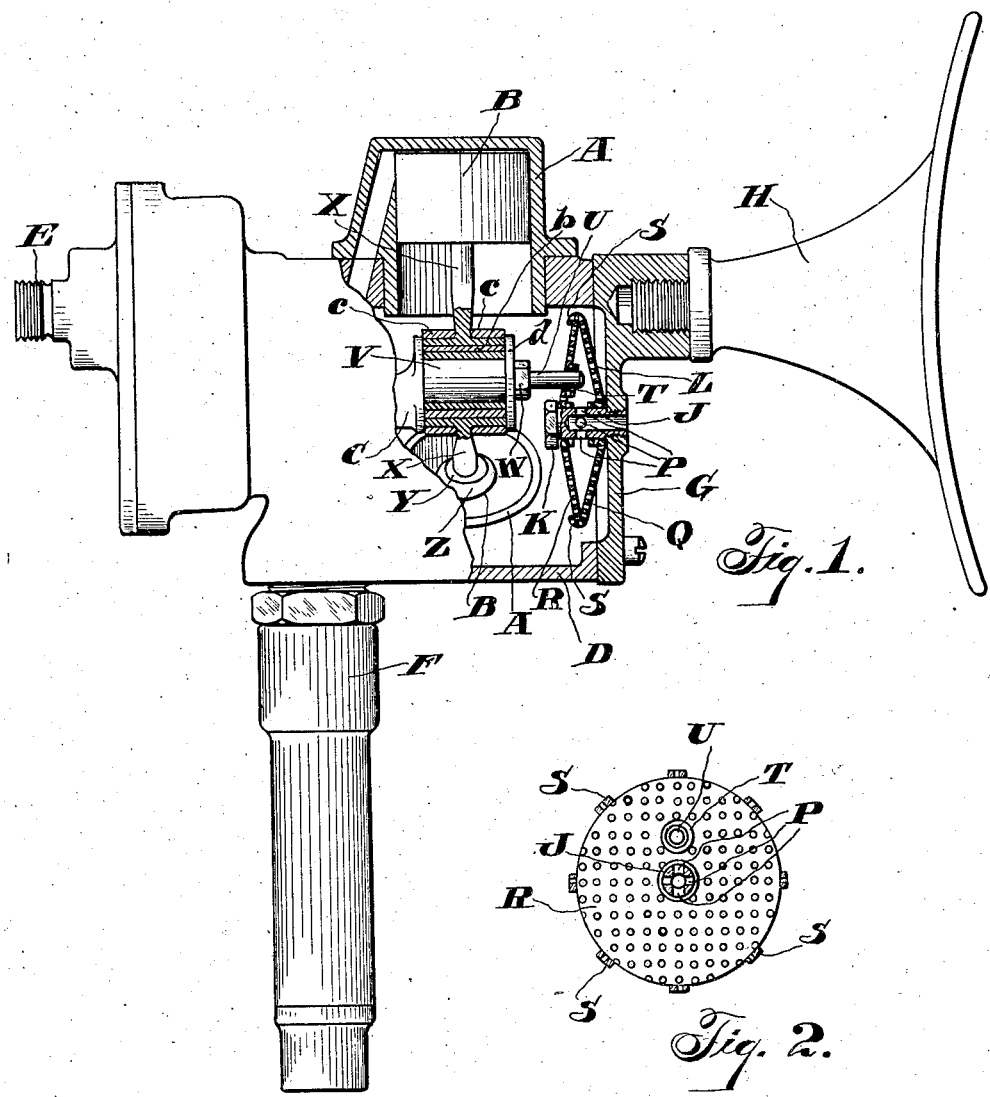

Sept. 13, 1927.

R. F. PAGE

VENTED MOTOR CASING

Filed Aug. 7, 1925

1,642,083

Inventor:
Robert F. Page, Deceased.
By John M. Felt, Administrator.
Herbert G. Ogden
HIS ATTORNEY Patented Sept. 13, 1927.

1,642,083

UNITED STATES PATENT OFFICE.

ROBERT F. PAGE, DECEASED, LATE OF ATHENS, PENNSYLVANIA; BY JOHN M. FELT, ADMINISTRATOR, OF ATHENS, PENNSYLVANIA, ASSIGNOR TO INGERSOLL-RAND COMPANY, OF JERSEY CITY, NEW JERSEY, A CORPORATION OF NEW JERSEY.

VENTED MOTOR CASING.

Application filed August 7, 1925. Serial No. 48,755.

This invention relates to motors, and more particularly to vents for motor casings which are adapted to separate oil from the air, permitting air to pass out of the casing while the oil is retained within the casing.

Within motor casings and more particularly in pneumatic motor casings almost always a pressure develops which is partly due to leakage around the motor piston or to the pumping action of the pistons. This air pressure should be vented to atmosphere in order to avoid pressure within the casing. This would be simple were it not for the fact that the casings are partially filled with oil which would be blown out of the usual vents very easily, resulting in the loss of oil and the disagreeable continual oiliness on the outside of the tool itself.

It is an object of this invention to vent the casing to atmosphere and to separate the oil from the air passing through the vent so as to be retained within the casing.

Other objects and advantages of the invention will be in part obvious and in part pointed out hereinafter.

In the drawing showing an embodiment of the invention and in which similar reference characters refer to similar parts, Figure 1 is a side view of a rotary drill, portions being in section to show the vent and oil separator for the casing, and Figure 2 is a sectional view of the oil separator.

Referring to the drawings, the motor comprises a plurality of cylinders A and pistons B arranged to reciprocate therein and operatively connected to a crank shaft C housed within a casing D upon which the cylinders A are mounted. The crank shaft C, in this case, is adapted to rotate a spindle E through suitable reduction gearing (not shown). The tool shown is a rotary drill preferably operated by compressed air admitted through a throttle handle F. A plate G forming one of the side walls of the casing supports a breast plate H in alignment with the spindle E so that the tool may be held against the work.

Tools of this description are lubricated by partially filling the casing D with an oil, preferably of heavy body. It is impractical to manufacture the pistons B so that they are absolutely air tight within the cylinders A and therefore air leaks continually from the cylinders into the casing D.

In order to relieve the pressure of the leakage air within the casing D so that oil will not be forced thereby out along the bearings of the spindle E and get onto the work, a vent is usually provided. One difficulty encountered with vents in the casing is that the oil is blown out through the vent along with leakage air. This is prevented in the present invention by a tube J extending from the interior of the casing through the wall G and closed at one end as shown at K, there being an apertured hollow disk L mounted over perforations P intermediate the ends of the tube J and located in the interior of the casing. The tube J may be screwed or otherwise secured in the rear wall G in axial alignment with the crank shaft. The disk L forming the grease separator is bodily rotatable and is rotatably mounted directly on the outside of the tube J and consists, in this instance, of two perforated members Q and R attached at their periphery as by turning over the projecting edges S.

The member R of the disc is provided with an aperture T to receive a stud U which forms an operative connection between the crank shaft C and the oil separator for rotating the latter at high speed. The stud U extends laterally from the crank pin V of the shaft C and is secured thereto by means of a lock nut W.

The pistons B rotate the crank shaft C by means of piston rods X. One end of the connecting rod X is ball shaped, as at Y, to engage a socket Z in the piston B. The other end of the connecting rod partly encircles a connecting rod sleeve $b$ and is held thereon by means of connecting rod rings $c$. A washer $d$ secured to the crank pin V by the nut W holds the rings and the piston rods in place on the crank pin, as shown in U. S. Patent No. 1,385,134, of July 19, 1921 to F. A. Jimerson.

In operation the crank shaft C revolves rapidly causing corresponding rapid rotation of the disc L. Air under pressure within the casing D can find its way into the interior of the disc L through the perforations and thence to atmosphere through the holes P and the tube J. The air within the disc L has imparted thereto a rotary motion by the rotation of the disc which causes particles of oil in the air to be thrown by centrifugal action toward the periphery of the disc and thence back out through the perforations in the disc into the casing D.

I claim:

1. A motor comprising a cylinder and piston, a crank shaft operatively connected with the piston, a casing housing said crank shaft and supporting the cylinder, a vent tube closed at one end and extending through the rear wall of the casing in axial alignment with the end of the crank shaft, said tube having perforations intermediate its length communicating with the interior of the casing, a hollow perforated disk bodily rotatable on said tube opposite the end of the crank shaft and mounted directly on said tube over said perforations, means for holding said disk against longitudinal movement on the tube, and a stud on the crank shaft engaging said disk to bodily rotate the disk on the tube about the axis of the crank shaft.

2. A motor comprising a cylinder and piston, a crank shaft operatively connected with the piston, a casing housing said crank shaft and supporting the cylinder, a vent tube closed at one end and extending through the rear wall of the casing in axial alignment with the end of the crank shaft, said tube having perforations intermediate its length communicating with the interior of the casing, a hollow perforated disk bodily rotatable on said tube opposite the end of the crank shaft and mounted directly on said tube over said perforations, said hollow disk consisting of two perforated cup shaped plates forming the walls of the disk and secured together at their peripheries, means for holding said disk against longitudinal movement on the tube, and a stud on the crank shaft engaging said disk to bodily rotate the disk on the tube about the axis of the crank shaft.

In testimony whereof I have signed this specification, as administrator.

JOHN M. FELT,
*Sole Administrator of the Estate of Robert F. Page, Deceased.*